July 10, 1928.                                                              1,676,740
D. W. R. MORGAN
CONDENSER
Filed April 19, 1927

INVENTOR
D.W.R. Morgan
BY
A.B. Reavis
ATTORNEY

Patented July 10, 1928.

1,676,740

UNITED STATES PATENT OFFICE.

DAVID W. R. MORGAN, OF SWARTHMORE, PENNSYLVANIA, ASSIGNOR TO WESTINGHOUSE ELECTRIC & MANUFACTURING COMPANY, A CORPORATION OF PENNSYLVANIA.

CONDENSER.

Application filed April 19, 1927. Serial No. 185,009.

My invention relates to radial flow condensers, and has for an object to provide for maintaining a uniform, high velocity of flow of motive fluid through a nest of tubes in the condenser of the type described, and to provide for more perfect scavenging of air and other non-condensable gases from the surfaces of the condensing tubes.

Another object is to provide a condenser, of the type described, which shall be arranged to assure a constant, high velocity of vapor flow through the tube nest, and which shall include a separate cooling chamber within the rest of condensing tubes for cooling air and other non- condensable gases previous to their removal through the air offtake.

In the operation of the surface condenser, it is desirable to maintain a constant as well as a relatively high velocity of flow for the gaseous media passing through the nest of tubes for so long as this gaseous media contains condensable gases. The completion of the process, of separating the condensable media by condensation while the vapors are passing through the nest with a uniform, high velocity, results in reducing to a minimum the effect of the low conductivity of the noncondensable media.

The conditions for maintaining a high, constant velocity of flow are most favorable when the path of vapor travel is short and direct. These conditions are, of course, inherent in the radial-flow condenser.

However, more perfect scavenging of air, and the like, from the surfaces of the condensing tubes can be obtained by providing means for compelling gaseous media to follow short, straight paths, thus precluding the possibility of permitting gaseous media to deviate on more tortuous courses, which would result in relieving some of the tubes of the full amount of their normal work of effecting condensation.

More particularly, therefore, the object of my invention is to provide means for substantially dividing the tube nest into various portions, in order to provide for more precisely apportioning the entering vapors to the various portions, and to assure that every portion of the cooling surfaces shall be equally and fully effective.

Apparatus embodying the features of my invention is shown in the accompanying drawings, in which.

Figure 1:
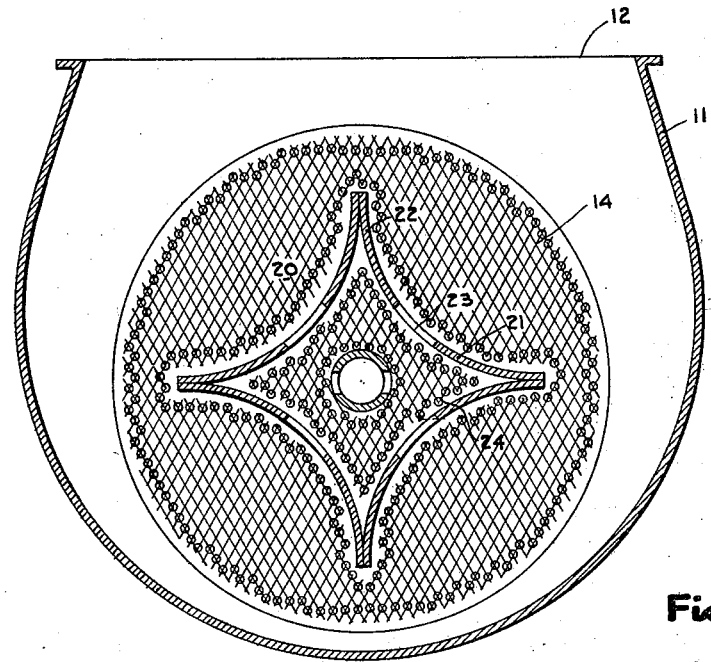
Fig. 1 is a transverse section of a radial flow condenser.
Figure 2:
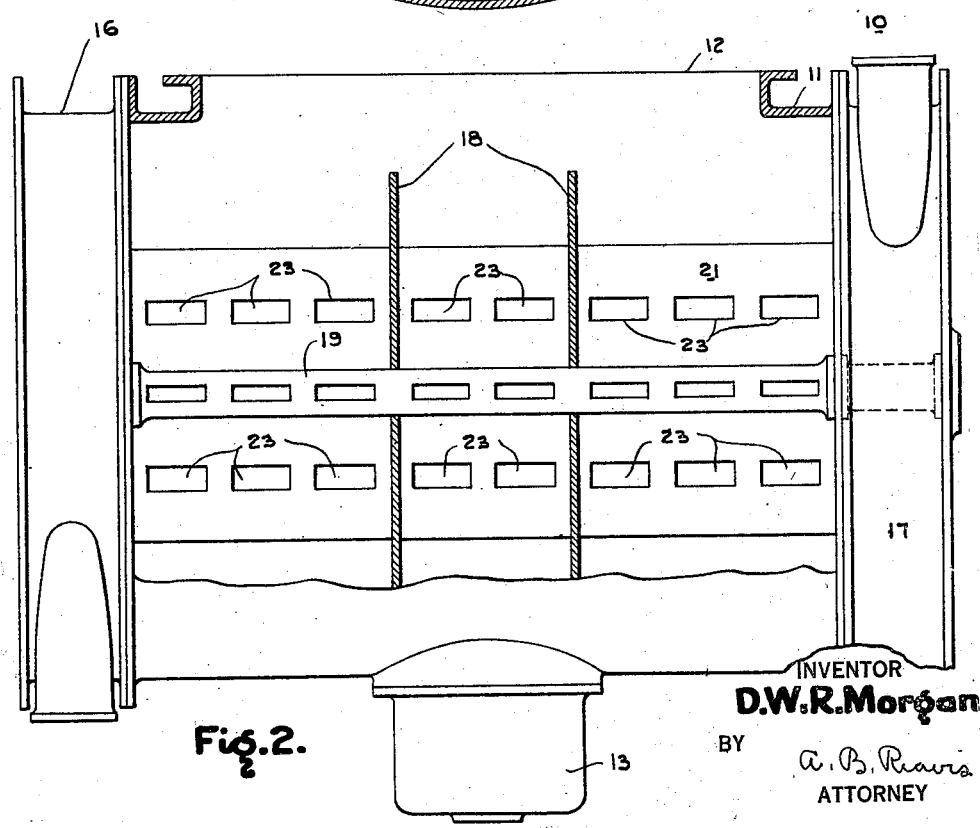
Fig. 2 is a sectional elevation of the condenser shown in Fig. 1.

According to my invention, the nest of condensing tubes is substantially divided by a centrally disposed, longitudinally extending structure, which is arranged to provide substantially radial partitions, the latter terminating in proximity to the outermost tubes of the nest. The partition members are, preferably, in the form of cusps, and, midway between these cusps, the central structure is provided with ports for the removal of air and other non-condensable gases from the nest of condensing tubes. The arrangement of the cuspidal partition members assures that gaseous media, which enters the portion of the nest between these partitions, must pass substantially radially to the removal ports at the junction of the bases of the respective partitions, and, hence, a short, direct path of vapor travel is assured.

My invention also contemplates the provision of a number of cooling tubes within this cuspidated structure, so that air and non-condensable gases may be cooled previous to their removal through the air offtake, which also extends within the central structure.

Referring now to the drawings for a better understanding of my invention, I show a radial-flow condenser, indicated generally at 10, and comprising a shell 11, having a motive fluid inlet connection 12, and provided with a hotwell 13.

A nest of tubes 14 is disposed within the shell, and an inlet water box 16 and a discharge water box 17 are provided for passing circulating media through the nest. Suitable tube supports 18 may be provided for supporting tubes of the nest. A centrally disposed and longitudinally extending air and non-condensable gas offtake 19 is provided within the nest of tubes 14.

The nest of tubes 14 is divided into substantially sector-shaped portions by the centrally disposed, longitudinally extending structure 21. Obviously, this structure 21 may be constructed in various ways, depending upon the form which the structure assumes.

Preferably, however, the structure 21 is formed of concavo-convex members, such as the plates 22, which are arranged with their convex sides innermost, and are joined together along their longitudinal edges to form a structure of a plurality of cusps. These cusps extend substantially radially through the tube nest and hence, serve as partitions to divide the tube nest into separate sections, each of which is, preferably, provided with suitable air and non-condensable gas removal ports. As shown, these ports 23 are located in the plates 22 substantially midway between the longitudinal edges of the latter.

Between the offtake 19 and the plates 22, I preferably provide a bank of tubes 24 for cooling air and other noncondensable gases previous to their removal through the offtake 19.

In the operation of my condenser, gaseous media enters the nest 14, from the periphery thereof, and passes into the respective portions defined by the plates 22. The gaseous media confined between the respective plates 22, then passes by the shortest possible route to the ports 23 and into the tube nest 24, from which it is removed through the offtake 19. The condensation of the condensable gases is effected by the tube nest 14 and the air and the other noncondensable gases are cooled by the tube nest 24 previous to their removal through the offtake 19.

It will readily be seen, therefore, that I have provided a simple and rugged structure which will compel motive fluid to pass through the tube nest along short, direct paths, and thus a constant, high velocity of vapor flow, as well as a more equal distribution of motive fluid throughout the tube nest are assured. In this way, more perfect scavenging of the air and the other non-condensable gases from the surfaces of the condensing tubes is obtained and, consequently, the performance of the condenser is improved. The simple structure which produces these results also provides a separate chamber within the nest of tubes for cooling the air and the other non-condensable gases previous to their removal from the condenser.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. A radial-flow condenser comprising a shell having an inlet, a nest of tubes within the shell, partition means dividing the nest into substantially sector-shaped portions and providing a central chamber for cooling air and non-condensable gases, a bank of tubes within the central chamber, and an air and non-condensable gas offtake extending within the central chamber.

2. A radial-flow condenser comprising a shell having an inlet, a nest of tubes within the shell, connections for passing circulating media through the tubes, a polygonal compartment having one or more concave sides and disposed longitudinally within the nest of tubes, and connections for removing media from said compartment.

3. A radial-flow condenser comprising a shell having an inlet, a nest of tubes within the shell, connections for passing circulating media through the tubes, a polygonal structure having three or more sides and disposed longitudinally within the nest of tubes, the corners of said structure being in proximity to the outermost tubes of the nest.

4. A radial-flow condenser comprising a shell having an inlet, a nest of tubes within the shell, connections for passing circulating media through the tubes, and a polygonal structure having three or more sides and disposed longitudinally within the nest of tubes, the corners of said structure being in proximity to the outermost tubes of the nest, the tubes of said nest being normally spaced closely adjacent to the sides of said structure.

5. A radial-flow condenser comprising a shell having an inlet, a nest of tubes within the shell, connections for passing circulating media through the tubes, and a longitudinally-extending cuspidated structure within the nest of tubes for collecting air and non-condensable gases.

6. A radial-flow condenser comprising a shell having an inlet, a nest of tubes within the shell, connections for passing circulating media through the tubes, and a longitudinally-extending cuspidated structure within the nest of tubes for collecting air and non-condensable gases, said structure having ports substantially midway between the cusps.

7. A radial-flow condenser comprising a shell having an inlet, a nest of tubes within the shell, connections for passing circulating media through the tubes, and a cuspidal structure extending axially within the nest of tubes for collecting air and non-condensable gases, the cusps of said structure terminating in proximity to the outermost tubes of the nest.

8. A radial-flow condenser comprising a shell having an inlet, a centrally disposed, longitudinally-extending air and non-condensable gas offtake within the shell, a cuspidal compartment encompassing the air and non-condensable gas offtake, a nest of tubes encompassing the compartment and within the shell, the tubes of said nest being spaced about and between the cusps of said compartment, and connections for passing circulating media through the nest of tubes.

9. A radial-flow condenser comprising a shell having an inlet, a longitudinally-extending air and non-condensable gas offtake within the shell, a cuspidal structure encompassing said offtake, a bank of tubes substantially encompassing said offtake and within said cuspidal structure, and a nest of tubes substantially encompassing said cuspidal structure and within the shell.

10. A radial-flow condenser comprising a shell having an inlet, a nest of tubes within the shell, connections for passing circulating media through the nest of tubes, partition means for dividing said nest into substantially sector-shaped portions, and means for removing air and other non-condensable gases from the respective portions.

In testimony whereof, I have hereunto subscribed my name this seventh day of April, 1927.

DAVID W. R. MORGAN.